Aug. 4, 1964     H. W. KNOX     3,143,155
TIRE
Filed May 29, 1961

United States Patent Office 3,143,155
Patented Aug. 4, 1964

3,143,155
TIRE
Harold Wayne Knox, Akron, Ohio, assignor to The Firestone Tire & Rubber Company, Akron, Ohio, a corporation of Ohio
Filed May 29, 1961, Ser. No. 113,505
2 Claims. (Cl. 152—330)

The present invention relates to improvements in tires manufactured by utilizing vulcanizing members, and to the method of producing tires of superior characteristics. Tires are generally manufactured by using one of two types of vulcanizing members: a cylindrical bladder, or a toroidal bag. In both cases, the vulcanizing member is placed within a substantially cylindrical, uncured tire, and then expanded to correct toroidal tire shape for the vulcanization process.

In this procedure, air tends to become trapped and form pockets between the outer wall of the vulcanizing member and the inner surface of the tire. Such air pockets constitute a definite hazard in the manufacture of the tire: these air pockets may mar the inner surface of the tire by creating areas of uneven gauge, through displacement of the rubbery material. Particularly where tubeless tires are concerned, such "light"-gauge areas in the inner-liner result in unusuable tires.

These air pockets may also, during the vulcanizing process, be forced into the tire proper, where the presence of air produces blistering and separation between the fabric plies and causes separation of the tread from the tire body portion; such separation results in scrap tires.

Additionally, trapped air can cause adjacent cords in the tire body plies to separate, thus "splitting" the rubberized fabric, again causing unfit tires.

In the case of tube-type tires, the danger of trapped air has, in many cases, forced manufacturers to cover the fabric splice-areas on the inner surface of the tire with special gum-stripping, or to increase the thickness of rubber on the interior tire surface, to exclude entry of air at these sensitive areas during vulcanization. This trapping of air is particularly grave where the vulcanizing member comprises a cylindrical bladder, since the diameter thereof is expanded greatly as the uncured tire is changed from cylindrical to toroidal shape.

The presence of these air pockets, further, tends to reduce the useful life of the vulcanizing bladder, since the prolonged presence of oxygen under vulcanizing heat and pressure at the bladder surface results in rapid oxidization of the bladder rubber and consequent early breakdown of the rubber compound.

Quite frequently, when the finished tire is to be mounted with an innertube, lubricants are used to reduce the possibility of the tube's binding or buckling as it is inflated against the interior of the tire. With a conventional tire, such mounting lubricants frequently run into one portion of the tire interior, while other areas remain insufficiently lubricated, resulting in buckling of the tube and its early failure.

Air pockets which are thus formed between the innertube and the interior surface of the tire during the mounting, may also later be the cause of tire-difficulties during service.

It has been proposed in the past to place venting grooves in the outside surface of the curing bag to attempt to bleed off the air which otherwise becomes trapped. To this end, prior art air-bags and bladders have sometimes been provided on their tire-contacting surface with parallel channels. Such grooves, however, whether they extend axially or at an angle to the axis of the bladder, pose several disadvantages to the tire.

Grooving, regularly spaced and of necessity deeply cut, produces ridges on the interior of the tire, which the tire cords tend to follow. This resulting waviness of the tire cords leads to uneven and nonuniform tires. It has been suggested that the cord-waviness be counteracted by increasing the amount of rubber on the inner tire surface; this results, however, in reduced tire life due to early flex failures, and cracking along the ridges.

Further difficulties are experienced in tire production with this type of formation, where preparations are sprayed on either the interior of the tire or the exterior of the bladder to insure that the bladder will release readily from the vulcanized tire. The solids in such preparations tend to become trapped in the bladder grooves; a filled groove cannot perform its venting function properly, and will soon promote trapped air, rather than prevent it.

Further, this type of formation, through its regularity, localizes tire stresses at flexing areas on the interior surface of the tire adjacent to the vent formations, resulting in early tire flex failures.

The present invention provides a tire and a method of producing such a tire which is not subject to the above disadvantages.

According to the present invention, there is provided a tire having impressed in the inner surface thereof a honeycomb structure comprising a plurality of laterally interconnected rib portions defining a series of depressed pockets.

These rib portions may take any path, regular or irregular, geometrical or free-form, annular or curvilinear, or any combination of these, so long as a large number of interconnected rib portions is formed which will aid in distributing stresses.

The rib formation may form a recurring pattern of crossing members, or may be in the form of a completely randomly directed, or irregularly occurring, pattern.

Further, since the air which is normally trapped between the tire and the bladder may now move along the paths of least resistance to reach the outside atmosphere, no danger exists that air will remain trapped simply because a single path is unavailable to bleed off the air.

Additionally, instead of providing regularly spaced or straight-line ribs on the inner tire surface, which result in wavy cords in the tire plies, the present invention provides instead a plurality of interconnected ribs on the tire interior, thus delocalizing stresses.

It is the object of the present invention, therefore, to provide a tire of increased performance life.

It is a further object of this invention to provide a tire less susceptible to the defects normally incurred in the forming and vulcanization thereof.

It is a further object to provide a tire, and a method of producing such a tire, which will provide for a better and more uniform distribution of the stresses of service.

It is another object of the present invention to provide on the interior surface of a tire a series of pockets defined and separated by an interconnected rib-formation, in such a manner as to provide a tire having superior resistance to inner-surface defects, to ply- and tread-separation, to cord-separation and -distortion.

Yet another object of this invention is to provide a tire which may be more easily and faultlessly assembled with an innertube, through its ability to retain mounting fluids in a large number of isolated pockets across the inner tire surface.

Other objects and advantages of the present invention will become apparent from the following description of the preferred form of the invention, reference being had to the accompanying drawings in which.

In the vulcanization of pneumatic tires, there is generally used one of two different types of internal pressurized members. One such member is generally known as an airbag and comprises a generally toroidal member, shaped like an inner-tube. Such an airbag is shown at 1 in FIGURE 6. In use, the airbag is placed inside an unvulcanized cylindrical tire prior to the vulcanization thereof. The airbag is inflated and expanded while the beads of the tire are brought toward each other, so that the tire will generally conform to the toroidal shape of the airbag within it. The tire and its airbag are thereafter placed in a mold and the tire cured under heat and pressure.

Figure 1:
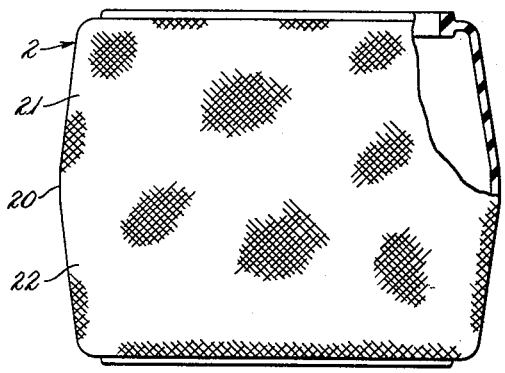
FIGURE 1 is a side elevation of a typical tire vulcanizing member, partially broken away and in section.
Figure 3:
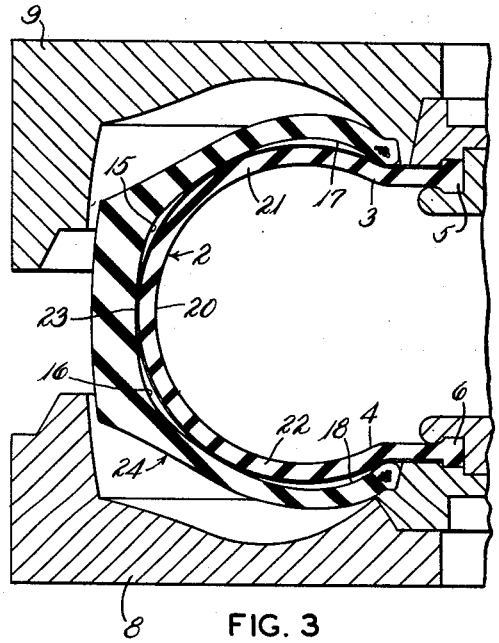
FIGURE 3 is a fragmentary, sectional view of a tire vulcanizing mold incorporating the tire of the invention, the mold being shown in partially closed position.

Another type of vulcanizing member, generally known as a bladder, is shown in FIGURE 1. For purposes of simplicity, the following description of the manufacturing method will refer to a vulcanizing bladder, but it will be understood that the invention may refer equally well to the conventional airbag-type of vulcanizing member. This vulcanizing bladder 2 is generally originally of cylindrical or barrel shape. In use, an unvulcanized cylindrical tire is placed about the outside of the bladder, whereupon the bladder is expanded into toroidal form, along with the tire, as shown, for example, in FIGURE 3. The ends 3 and 4 of the vulcanizing bladder 2 may be held as at 5 and 6 with relation to the respective halves 7 and 8 of the tire mold 9, and the bladder is caused to expand into the toroidal form shown in FIGURE 4 when the mold is completely closed. Alternatively, the vulcanizing bladder may be placed in the tire in an operation prior to insertion of the entire tire-and-bladder unit in the curing press.

During the initial stages of vulcanization of the tire, as the vulcanizing bag or bladder is expanded against the inner surface of the tire, air pockets tend to become trapped between the outer surface of the vulcanizing bag and the inner surface of the vulcanizing bag and the inner surface of the tire. The shoulder areas 15, 16 and the bead areas 17, 18 of the tire are particularly susceptible of this air trapping.

The bladder 2 has a central portion 20 of increased diameter. Between the central portion and the ends of the bladder are shown sloping sidewall portions 21 and 22. As the bladder is expanded into an unvulcanized tire, it will be noted that the central, large-diameter portion 20 of the bladder will contact the central portion 23 of the interior of the tire 24 first, whereafter the wall portions 21 and 22 of the bladder will progressively roll outwardly along the inner surface of the tire towards the bead areas 17 and 18, which will finally be contacted by end portions 3 and 4 of the bladder.

Figure 2:
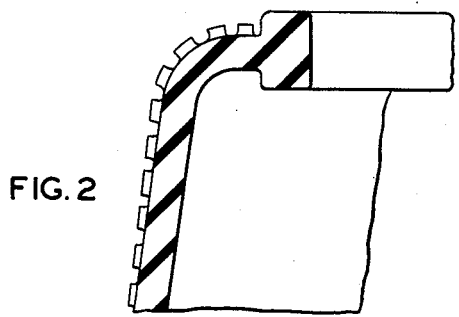
FIGURE 2 is an enlarged, fragmentary sectional view of a tire vulcanizing member similar to that of FIGURE 1.

The exterior of the vulcanizing bladder surface 20, 21, 22 is provided with venting means, as seen in FIGURE 2. In FIGURE 6, the means is shown as comprising a plurality of raised portions 30, separated by channels 31. The periphery of these portions may be free-form or geometrical, curvilinear or straight-sided, or indeed any combination thereof. A recurring honeycomb pattern has proved useful, and produces the tire of the invention shown in FIGURE 5, wherein a plurality of depressed pockets 32 is bordered by laterally interconnected ribs 33 traversing the inner surface of the tire in different directions.

Truck tires in the 11.00–20 size have been successfully produced, which were provided on the interior surface with pockets having lateral dimensions in the range of $\frac{1}{16}''$ to $\frac{5}{16}''$, separated by ribs having a width of up to about $\frac{1}{16}''$, the pockets varying in depth with respect to the inner surface of the tire; thus, the height of the ribs near the tire crown was .015'', and .030'' near the tire beads of the tire, as shown in FIGURE 2.

Other useful tires have been produced with ribs having heights of .010'' at the crown, and .020'' near the tire bead areas. Tires having pocket areas and ribs differing from the above are useful, as are tires in which the ribs are of uniform height. The rib height may also change uniformly from the crown area of the tire toward the bead portions thereof, or may change by increments.

For smaller tires, such as, for example, passenger tires of the 6.50–13 size, a suitable pattern used had its dimensions reduced by about $\frac{1}{3}$ over the above truck sizes. For tires larger than the truck sizes, such as, for example, tires for off-the-road-use, dimensions of approximately 1½ times the size of those used in truck tires were found useful.

Figure 5:
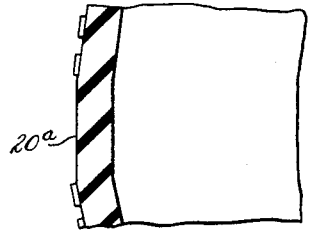
FIGURE 5 is a fragmentary, perspective, sectional view of a tire produced according to the invention.
Figure 5:
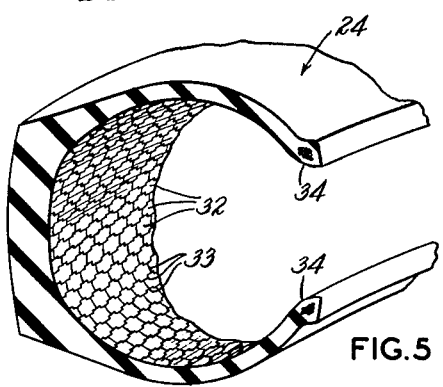
Figure 6:
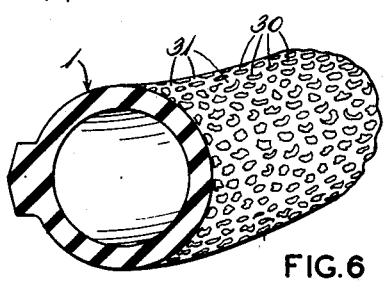
FIGURE 6 is a fragmentary, perspective, sectional view of another type of vulcanizing member used in the production of the tire of the invention.

Passenger tires have been produced in the 8.50–14 size, which were provided in the crown area with a honeycomb pattern such as shown in FIGURE 5, and which had a more random arrangement of differently-sized pockets in the bead areas, which arrangement was found to produce an increased service life for the vulcanizing bladder.

An overall honeycomb structure such as shown in FIGURE 5 was incorporated into 8.50–14 passenger tires, using pocket areas having dimensions of from about $\frac{1}{4}''$ by $\frac{7}{16}''$ to $\frac{3}{16}''$ by $\frac{5}{16}''$. It will be noted that in order to provide for a recurring pattern in which the pockets would "match up," the largest dimension pockets were located at the largest diameter (i.e., in the tire crown area), while the size of the pockets diminishes at successively smaller radii (i.e., toward the tire bead areas). In this particular case, a useful honeycomb structure embodied about 14,000 pockets in the interior surface of the tire.

The smaller type of structure set forth above has been used successfully, also, in truck tires of the 11.00–19 size, so that the above examples of dimensions used should be understood to be merely illustrative, not limiting.

The above dimensions are examples, and it will be understood that a wide range of sizes, shapes and dimensions, as well as combinations thereof, may be used, so long as adequate means for delocalizing tire stresses, and for trapping mounting fluid, are provided.

Figure 4:
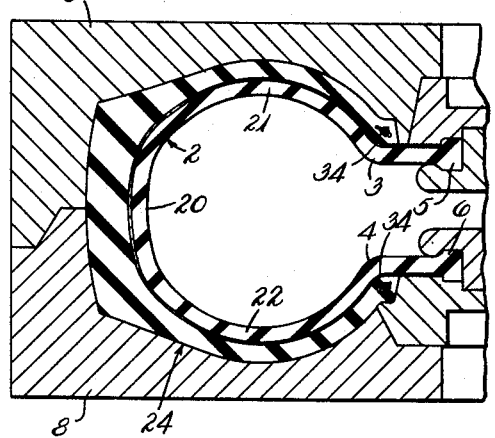
FIGURE 4 is a view similar to FIGURE 3, with the mold in the fully closed position.

It will be noted that the novel ribbing is shown, for example, in FIGURES 4 and 5 to extend along the inner surface of the tire all the way to the toe area 34 of the tire bead.

Since the large-diameter central portion 20 of the bladder 2 initially engages the central portion 23 of the tire in the forming and vulcanizing steps, no trapping of air is generally found to take place here. It may, therefore, not be necessary to provide venting means in this central portion, as shown at 20a in FIGURE 2. In order, however, to insure complete venting of all air from between the tire and the bladder, and to provide complete stress delocalization and mounting-fluid trapping, it may be preferred to continue the means of the invention over the entire surface of the vulcanizing bladder, such as shown in FIGURES 1, 3, 4, 5 and 6, so that the inner surface of the vulcanized tire, from bead to bead, will be provided with the typical configuration.

It will be seen from the above that an improved tire manufacturing process has been provided, which will produce a tire of superior quality.

The tire manufactured by prior methods was subject to many types of defects incurred in the forming and vulcanization thereof, and stemming, to a great degree, from failure to provide proper means and methods for venting air properly from between tire and vulcanizing member. These defects of manufacture are, for example, the occurrence of areas of uneven gauge; "blisters" of air driven into the tire, and separation ply from ply, or tread from ply; or separation laterally of adjacent cords in a ply.

These defects of manufacture are now reduced to a minimum with the present invention, so that tires may now be produced with lower-gauge rubbery insulation at the inner tire ply, without apprehension about "air"-damage to the tire.

In addition, proper mounting of such tires with innertubes is assured, since the formation of the tire interior is such as to maintain more equal distribution of mounting lubricants.

Further, the tire of the present invention will have an increased operating life, due to the decentralization of stresses, which would normally occur in flexing areas adjacent to the deeply-cut, regularly occurring, parallel-type of ribs of the prior art.

Although a preferred form of the invention has been described and shown in the drawings, it will be understood that variations and modifications may be made by anyone skilled in the art without departing from the scope of the present invention, which is defined by the following appended claims.

What is claimed is:

1. A tire comprising a fabric-reinforced body having a crown and sidewall portions terminating in inextensible beads, and means on the interior surface of said tire to delocalize the stresses in said tire body, said means extending along the interior tire surface from the crown portion to the beads and comprising laterally interconnected rib portions defining a plurality of isolated, depressed irregular pockets in the interior surface of said tire.

2. A tire as in claim 1, wherein said rib portions vary in height across the interior surface of said tire.

References Cited in the file of this patent

UNITED STATES PATENTS

| | | |
|---|---|---|
| 1,059,843 | Dawson | Apr. 22, 1913 |
| 1,827,668 | Musselman | Oct. 13, 1931 |
| 1,938,539 | Lyman | Dec. 5, 1933 |
| 2,026,161 | Collins | Dec. 31, 1935 |
| 2,678,468 | Smith | May 18, 1954 |
| 2,686,554 | Hinman | Aug. 17, 1954 |
| 2,779,386 | Waters | Jan. 29, 1957 |
| 2,790,205 | Parker | Apr. 30, 1957 |
| 3,016,320 | Beckadolph | Jan. 9, 1962 |